(12) United States Patent
Urbani

(10) Patent No.: US 9,630,855 B2
(45) Date of Patent: Apr. 25, 2017

(54) ALTERNATIVE ADDITIVES TO ENHANCE SLURRY DEWATERING

(71) Applicant: ECOLAB USA INC., St. Paul, MN (US)

(72) Inventor: Carl Nicholas Urbani, Lesmurdie (AU)

(73) Assignee: ECOLAB USA INC, St. Paul, MN (US)

( * ) Notice: Subject to any disclaimer, the term of this patent is extended or adjusted under 35 U.S.C. 154(b) by 46 days.

(21) Appl. No.: 14/190,507

(22) Filed: Feb. 26, 2014

(65) Prior Publication Data

US 2015/0240328 A1  Aug. 27, 2015

(51) Int. Cl.
*C01F 7/06* (2006.01)
*C22B 3/22* (2006.01)
*C22B 21/00* (2006.01)

(52) U.S. Cl.
CPC ............ *C01F 7/06* (2013.01); *C22B 3/22* (2013.01); *C22B 21/0015* (2013.01)

(58) Field of Classification Search
IPC ....................................................... C22B 26/12
See application file for complete search history.

(56) References Cited

U.S. PATENT DOCUMENTS 4,939,288 A * 7/1990 Talley .............................. 560/81
5,451,329 A * 9/1995 Bode et al. .................... 210/728

\* cited by examiner

*Primary Examiner* — Melissa Swain
(74) *Attorney, Agent, or Firm* — Kagan Binder, PLLC

(57) ABSTRACT

The invention provides methods and compositions for improving dewatering of Bayer Process alumina trihydrate slurry. The method comprises adding an R-Succinic Compound (such as octadecenyl succinic acid, hexadecenyl succinic acid, and/or dodecenyl succinic acid) to the slurry. The R-Succinic Compound removes water that would otherwise be trapped within the filtered slurry cake and therefore reduces the energy needed to calcine the resulting solids.

15 Claims, 2 Drawing Sheets

ALTERNATIVE ADDITIVES TO ENHANCE SLURRY DEWATERING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the dewatering of mineral slurries. In particular, it relates to compositions and application of dewatering aids for use in the Bayer process with the aim of reducing moisture in filtered and washed alumina trihydrate.

In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

As described at least in part, among other places, in U.S. Pat. No. 6,814,873, the Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where an aqueous slurry is prepared. The slurry makeup solution is typically spent liquor (described below) and added caustic solution. This bauxite ore slurry is then passed through a digestion stage where in a digester or a series of digesters the available alumina is released from the ore as caustic-soluble sodium aluminate. The digested slurry is then cooled, for instance to about 220° F., employing a series of flash tanks wherein heat and condensate are recovered. The aluminate liquor leaving the flashing operation contains insoluble solids, which solids consist of the insoluble residue that remains after, or are precipitated during, digestion. The coarser solid particles may be removed from the aluminate liquor with a "sand trap", cyclone or other means. The finer solid particles may be separated from the liquor first by settling and then by filtration, if necessary.

The clarified sodium aluminate liquor is then further cooled and seeded with alumina trihydrate crystals to induce precipitation of alumina in the form of alumina trihydrate, $Al(OH)_3$. The alumina trihydrate particles or crystals are then classified into various size fractions and separated from the caustic liquor. The remaining liquid phase, the spent liquor, is returned to the initial digestion step and employed as a digestant after reconstitution with caustic.

Within the overall process, one of the key steps is that of precipitation of the alumina trihydrate from the clarified sodium aluminate liquor. After the insoluble solids are removed to give the clarified sodium aluminate liquor, also referred to as "green liquor", it is generally charged to a suitable precipitation tank, or series of precipitation tanks, and seeded with recirculated fine alumina trihydrate crystals. In the precipitation tank(s) it is cooled under agitation to induce the precipitation of alumina from solution as alumina trihydrate. The fine alumina trihydrate particles are re-used within the process and act as seed crystals which provide nucleation sites and agglomerate together and grow as part of the precipitation process. Larger sized crystals resulting from the precipitation step are separated and used directly as trihydrate product or more often further processed by a calcination step that produces alumina $Al_2O_3$ which is sold as product.

A key step in the Bayer process is the separation of the trihydrate crystals into the various size fractions (seed and product size material) and the subsequent separation of the crystals from the liquor from which they precipitated. The removal of the liquor is typically achieved by a filtration and water washing step. Such a filtration and washing process can be applied to both the seed crystals and/or the product sized alumina trihydrate but is most often and critically applied to the product sized material.

It is critical that the product sized alumina trihydrate has only a minimal amount of caustic liquor remaining with the filtered cake since minimal soda content in the calcined product is required to maximize the value of the resulting alumina. As a result, product sized alumina trihydrate crystals typically undergo a series of water washing steps to remove caustic. However, moisture remaining with the filtered cake can also create an issue for producers since the subsequent heating and calcination of the trihydrate requires more energy input when an increased moisture content of the filtered trihydrate product occurs. As a consequence, alumina producers aim to minimize the moisture content of alumina trihydrate product. Dewatering aids are widely used by the alumina industry to improve filtration efficiency by reducing trihydrate moistures. Such products are typically, but not exclusively, added to the water washing step in order to improve the drainage and removal of the wash water from the solids so as to minimize the residual moisture content of the filtered cake. Significant savings can be achieved in the plant by improved dewatering and deliquoring of hydrate, such savings being achieved as a result of reduced moisture levels and lower energy costs in calcination.

A wide range of variables affect the dewatering of the trihydrate. These include slurry temperature, filtrate surface tension, solid/liquid contact angle, pressure gradient across the cake and particle size distribution and shape.

As described at least in part, among other places, in U.S. Pat. No. 5,011,612, a range of dewatering aid products based on a variety of surfactant chemistries are either available or known to those familiar with the art. Such products include surfactants and/or surfactant blends containing alkylsulfosuccinates, alkyl aryl sulfonates, ethoxylated alcohols or fatty acids. Examples are mentioned in Chinese Patent application CN 200910243379 and Scientific Paper The Use of Surfactant Mixtures in the Dewatering of Alumina Trihydrate, by D. J. Fox et al, School of Chemical Engineering and Industrial Chemistry, University of New South Wales, Australia (1987) pp. 159-163. Others include the use of fatty acid of at least 12 carbon atoms in admixture with non-ionic surfactants in U.S. Pat. No. 5,167,831. While a number of these are effective, issues remain for the industry in terms of cost and/or adverse impacts of such materials on downstream processing steps within Bayer plants. Thus there is clear need and utility for a method of improving the range and performance of dewatering aids that can be used in the Bayer process.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of enhancing the dewatering of alumina trihydrate bearing slurry. The method comprises the step of adding to the slurry or to wash water added to the slurry; at least one R-succinic compound.

The R-succinic compound may be one item selected from the list consisting of: octadecenyl succinic acid, hexadecenyl succinic acid, dodecenyl succinic acid, and any combination thereof. The composition may further comprise a base. The composition may be more effective as a dewatering agent than a similar composition comprising a similar or greater molar amount of dioctylsulfosuccinate, fatty acid, or any combination thereof than the molar amount of R-succinic compound in the composition. The composition may be added to slurry taken from the classification stage of a Bayer Process. The composition may be added to slurry upstream from a calcination stage of a Bayer Process. The composition may be added to wash fluid added to the slurry or used within the filtration process. The R-succinic compound may form in situ within the slurry or wash fluid. The R-succinic compound may form from an anhydride added to the slurry or wash fluid.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
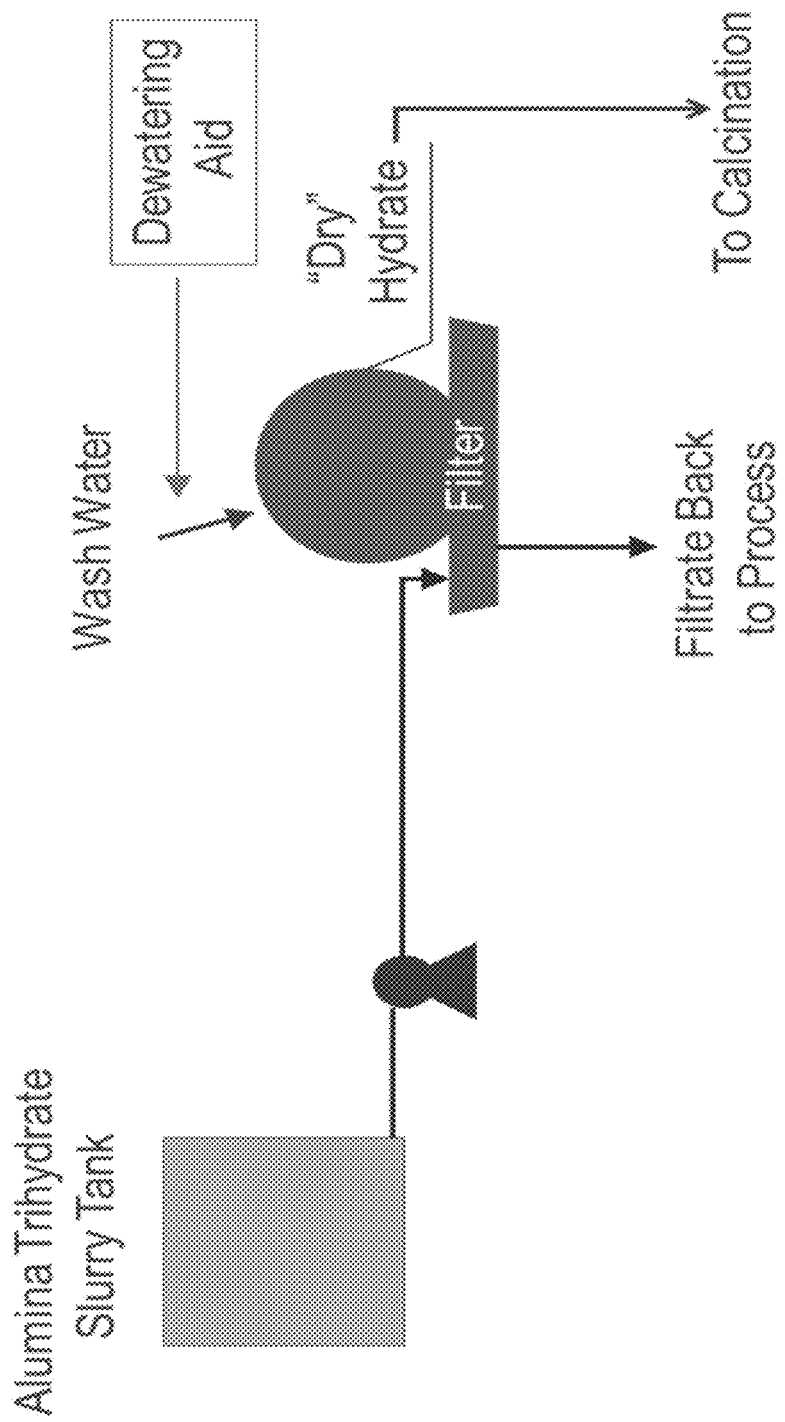
FIG. 1 is an illustration of the application of the invention in the Filtration Stage of a Bayer Process.

The following definitions are provided to determine how terms used in this application, and in particular how the claims, are to be construed. The organization of the definitions is for convenience only and is not intended to limit any of the definitions to any particular category.

"R-Succinic Compound" means any one or more molecule(s) (including but not limited to octadecenyl succinic acid, hexadecenyl succinic acid, and/or dodecenyl succinic acid), whose structure conforms to the generalized structure of: Formula 1, Formula 2, conjugate acid-bases thereof, and any combination thereof, wherein Formula 1 and Formula 2 are:

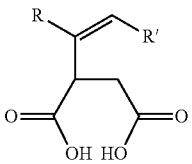

Formula 1

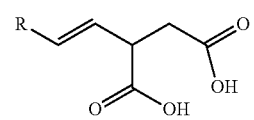

Formula 2 where R and R' are independent, distinct, and represent alkyl, alkenyl, or aromatic hydrocarbon groups containing 1-30 carbon atoms "Octadecenyl Succinic Acid" means a molecule and acid-base conjugates thereof having a structure of:

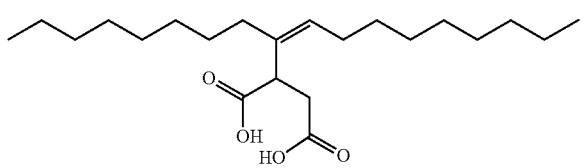 [SMILES: CCCCCCCC/C=C(/CCCCCCCC)C(CC(=O)O)C(=O)O]

"Hexadecenyl Succinic Acid" means a molecule and acid-base conjugates thereof having a structure of:

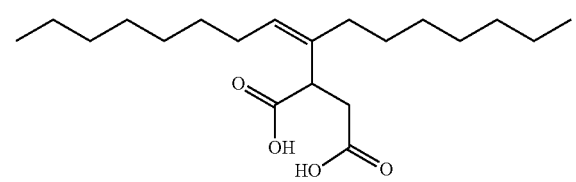 [SMILES: CCCCCCC/C=C(/CCCCCCC)C(CC(=O)O)C(=O)O]

"Dodecenyl Succinic Acid" means a molecule and acid-base conjugates thereof having a structure of:

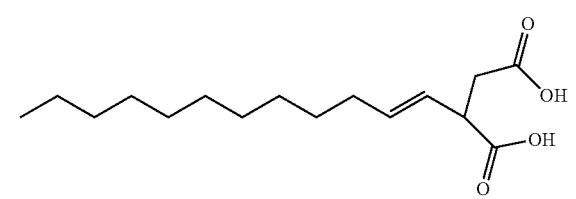 [SMILES: CCCCCCCCCC/C=C/C(CC(=O)O)C(=O)O]

"Consisting Essentially of" means that the methods and compositions may include additional steps, components, ingredients or the like, but only if the additional steps, components and/or ingredients do not materially alter the basic and novel characteristics of the claimed methods and compositions.

"Filter" means a structure constructed and arranged to remove suspended materials from within a liquid that is passed through it, more detailed descriptions of filters and filtration are described in *The Nalco Water Handbook* (3rd Edition), by Daniel Flynn, McGraw Hill (2009) in general and in particular pp. 6.1-8.30.

"Filter Cake" means the accumulation of solid matter that is retained on a filter, it increases in the course of filtration and becomes thicker as more particulate matter is retained, with increasing layer thickness the flow resistance of the filter cake increases, and if not removed soon enough, eventually thick filter cake can disrupt filtration because the flow resistance of the filter cake gets so high that too little of the liquid from the slurry being filtered can pass through the filter cake and the filter plugs.

"Liquor" or "Bayer liquor" means a caustic, liquid medium that has run through a Bayer process in an industrial facility.

"Membrane" means a structure having lateral dimensions much greater than its thickness though which a mass transfer may occur, membranes may be used to filter liquids.

"Separation" and "Separation Method" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Slurry" means a mixture comprising a liquid medium within which finely divided solids are dispersed or suspended, the liquid medium may be entirely water, partially water, or may not contain any water at all.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Water Soluble" means materials that are soluble in water to at least 3%, by weight, at 25 degrees C.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is directed towards the addition of a dewatering composition to precipitated alumina trihydrate in the filtration stage of a Bayer Process. The composition comprises at least one R-succinic compound. The R-succinic compound may be one item selected from: octadecenyl succinic acid, hexadecenyl succinic acid, dodecenyl succinic acid, and any combination thereof.

As previously mentioned and as described in U.S. Pat. Nos. 7,771,681, 7,976,820, 7,976,821, and Published Patent Application 2007/0172405, generally the Bayer Process is a sequential loop through which alumina bearing liquor passes. The process comprises: a digestion stage where alumina is extracted from Bauxite ore, a clarification stage where red mud is removed, a precipitation stage where alumina trihydrate is formed, and a classification stage where precipitated alumina trihydrate "seeds" of various sizes are separated out of the liquor. After classification the liquor may be reintroduced into the digestion stage and the precipitated alumina trihydrate (in the form of a slurry) passes on to a filtration stage and then to a calcination stage where the final alumina product is formed.

In the filtration stage the water and alumina trihydrate bearing slurry is acted on to remove as much liquor and water as possible. The better the water removal, the lower the energy required to complete the subsequent calcination stage. As a result any number of separation methods can be applied. These methods include but are not limited to gravity separation, pressure separation, vacuum separation and any combination thereof. In at least one embodiment the composition is added before the slurry is separated, while the slurry is separated, and/or after the slurry is separated.

As illustrated in FIG. 1, in at least one embodiment wash fluid is added to the slurry before, during, and/or after the separation. The wash fluid may comprise water and/or may consist essentially of water. The composition may be added to the wash fluid, may be added to the slurry alongside wash fluid, may be added to the slurry before the wash fluid, may be added to the slurry after the wash fluid, and any combination thereof.

The effectiveness of this composition is quite unexpected. As described in such references as U.S. Pat. Nos. 5,011,612, 5,454,329, and 5,167,831, US Published Patent Application 2012/0288438 A1, and European Patent Documents EP0417360B1, EP0672620B1, EP1406711B1, EP0460811A1, EP0286034A1, fatty acids such as oleic acid and alkylsulfosuccinate compounds such as dioctylsulfosuccinate are known to be effective dewatering agents. The effectiveness of this composition however is in contrast to previous expectations. In prior art compositions it was assumed that a strong carboxylic acid was needed to grasp the water molecules and the fatty region was to address steric and lipophilic obstacles the acid faced. In contrast the structure of the open ring, and in particular the presence of two reflection carboxyl groups results in an acid that has an overall pKa which is lower than those of the prior art yet which is more effective than the prior art. In addition because of its lower pKa, R-succinic compounds have fewer unwanted downstream reactions than prior art fatty acid dewatering agents. In at least one embodiment the composition comprises an R-succinic compound with a lower pKa than dioctylsulfosuccinate and/or oleic acid yet is more effective as a dewatering agent.

Without being limited by a particular theory or design of the invention or of the scope afforded in construing the claims, it is believed that the unique structure of the R-succinic compound is what causes exceptionally effective dewatering effects. The R-succinic compound comprises an open ring which contains carbonyl and hydroxide groups whose unique charge distribution may be able to "grasp" and "pull" water molecules that would otherwise remain hydrogen bonded to the alumina trihydrate. The ring structure and "two-headed" nature of the acid site therefore works better than would be expected by the lower pKa.

In at least one embodiment the composition also comprises a ring opening agent. Under certain chemical conditions the open ring of the R-succinic compound could close by the formation of an anhydride bond between the hydroxide groups. The ring opening agent acts to prevent such ring closings. In at least one embodiment the ring opening agent is a base. The base may be selected from the list consisting of: potassium hydroxide, sodium hydroxide, sodium bicarbonate, sodium carbonate, ammonia, organic bases (including but not limited to triethylamine), and any combination thereof. The ring opening agent may be a catalyst and/or may be a reactive composition. In at least one embodiment the composition comprises an R-succinic compound in equilibrium between being open ringed and close ringed and the ring opening agent favorably shifts the equilibrium to favor the open ringed configuration. In at least one embodiment if in excess the ring opening agent would hydrolyze at least part of the ring and the dosage of the agent is sufficient to favorably shift the equilibrium to favor the open ringed configuration but not substantially hydrolyze any part of the ring.

Figure 2:
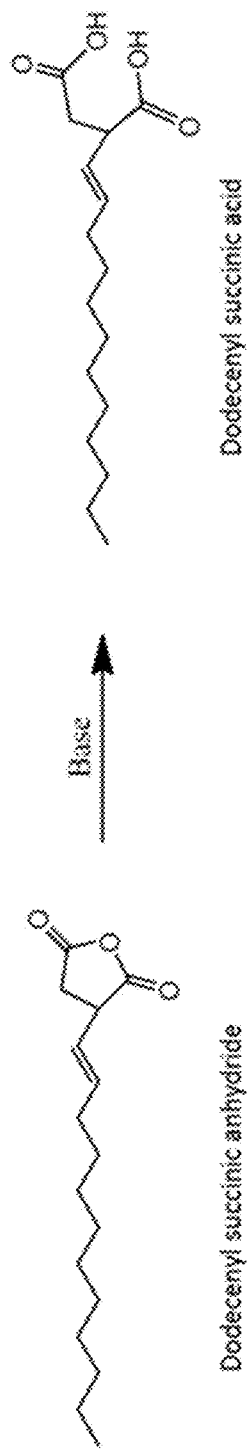
FIG. 2 is an illustration of the synthesis of an "R-Succinic Compound".

In at least one embodiment the R-succinic compound is formed by opening the ring of an R-succinic anhydride compound. For example as illustrated in FIG. 2 dodecenyl succinic anhydride (which is representative of any C1-C100 succinic anhydride) can be used to make the R-succinic compound. The R-succinic compound may be formed as a result of a base driven reaction.

In at least one embodiment the R-succinic compound is stored in an anhydride form and its ring is opened immediately prior to or simultaneous to its introduction into the slurry or into the wash fluid.

In at least one embodiment the composition reduces the amount of wash fluid required to remove the same amount of water from the slurry relative to use of a prior art dewatering agent.

In at least one embodiment the composition reduces the amount of energy required to calcine the solids relative to use of a prior art dewatering agent.

In at least one embodiment a lower dosage of the composition (and/or of the R-succinic compound) is required to remove the same amount of water from the slurry relative to use of a prior art dewatering agent.

In at least one embodiment the composition reduces the amount of water remaining with the filter cake resulting from a separation method that the slurry goes through, relative to use of a prior art dewatering agent.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of formulations were prepared to simulate the dewatering effectiveness of prior art fatty acid dewatering agents and the inventive composition. Table 1 summarizes the formulations.

TABLE 1

| Formulation | Active Type | Active % | Water/KOH % | Other Components % |
|---|---|---|---|---|
| A* | Fatty Acid | 25 | 35 | 40 |
| B* | Fatty Acid | 25 | 0 | 75 |
| C | ODSA | 25 | 58 | 17 |
| D | DSA | 25 | 60 | 15 |
| E | Fatty Acid | 5 | 95 | 0 |
| F | ODSA | 5 | 95 | 0 |
| G | HDSA | 5 | 95 | 0 |

*Commercially available product
DSA = Dodecenyl succinic acid prepared from dodecenyl succinic anhydride
HDSA = Hexadecenyl succinic acid prepared from hexadecenyl succinic anhydride
ODSA = Octadecenyl succinic acid prepared from octadecenyl succinic anhydride The test procedure that the samples underwent was as follows: Filtered alumina refinery spent liquor (200 mL) and alumina trihydrate (80 g) was added to 250 mL Nalgene bottles to prepare the slurry. De-ionised water (200 mL), for use as the wash water, was added to separate 250 mL Nalgene bottles. All of the bottles were then placed in a rotating water bath at 65° C. for a minimum period of 2 hours. A bottle of slurry was poured into a Buchner funnel (130 mm diam., Whatman 540 filter paper) and allowed to settle for 20 seconds then a vacuum was applied. (During this time the appropriate quantity of dewatering aid was added to the wash water (5-80 mg)). The solution was then shaken for a period of 30 seconds. After 30 seconds the vacuum was removed, the wash water/dewatering aid solution added onto the cake and the vacuum re-applied for a period of 80 sec. The cake was then sampled from the centre of the cake and the moisture content was determined gravimetrically by drying in an oven at 110° C.

The results of the tests were as follows:
Dewatering Aid Tests

TABLE 2

DSA product formulation vs commercially available formulation

| Formulation Used | Actives Dose (g/T of alumina trihydrate) | % Reduction in Cake Moisture |
|---|---|---|
| A (Fatty Acid) | 14 | 4.2 |
|  | 28 | 16.5 |
| D (DSA) | 14 | 5.8 |
|  | 28 | 18.6 |

TABLE 3

ODSA product formulation vs commercially available formulation

| Formulation Used | Actives Dose (g/T of alumina trihydrate) | % Reduction in Cake Moisture |
|---|---|---|
| B (Fatty Acid) | 37.5 | 11.0 |
| B (Fatty Acid) | 50 | 20.9 |
| C (ODSA) | 37.5 | 15.1 |
| C (ODSA) | 50 | 29.8 |

TABLE 4

ODSA and HDSA product formulations vs equivalent fatty acid based formulation

| Treatment | Actives Dose (g/T of alumina trihydrate) | % Reduction in Cake Moisture |
|---|---|---|
| E (Fatty Acid) | 50 | 24.6 |
| F (ODSA) | 50 | 32.0 |
| G (HDSA) | 50 | 26.6 |

The data demonstrates that all things equal, the inventive composition provides superior performance than would be expected for a fatty acid dewatering agent with its properties.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method comprising:
    adding a wash fluid to an alumina trihydrate bearing slurry comprising alumina trihydrate and caustic-soluble aluminate liquor;
    adding to the alumina trihydrate bearing slurry or to the wash fluid a composition comprising at least one R-succinic compound having a structure selected from formula (I) or formula (II), a conjugate acid-base of the R-succinic compound having a structure selected from formula (I) or formula (II), and combinations thereof; wherein formula (I) is

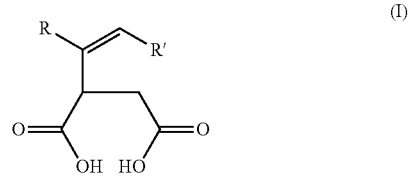

and formula (II) is

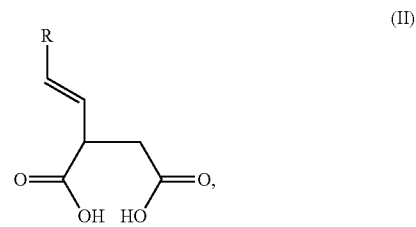

and
wherein R and R' are independent, distinct, and represent alkyl, alkenyl, or aromatic hydrocarbon groups containing 1-30 carbon atoms.

2. The method of claim 1, wherein the R-succinic compound is selected from octadecenyl succinic acid, hexadecenyl succinic acid, dodecenyl succinic acid, or any combination thereof.

3. The method of claim 1 wherein the composition further comprises a base.

4. The method of claim 1, further comprising in order:
    preparing an aqueous slurry of pulverized bauxite ore and caustic solution;
    digesting, comprising extracting alumina from the bauxite ore as a caustic-soluble aluminate liquor;
    clarifying, comprising removing solid particles from the liquor;
    precipitating, comprising forming the alumina trihydrate bearing slurry from the liquor, and
    classifying, comprising separating alumina trihydrate seeds from the liquor.

5. The method of claim 1, further comprising:
    removing liquor and water from the alumina trihydrate bearing slurry to give alumina trihydrate.

6. The method of claim 5, further comprising calcining the alumina trihydrate.

7. The method of claim 1, wherein the R-succinic compound forms in situ within the alumina trihydrate bearing slurry or the wash fluid by opening the ring of an R-succinic anhydride compound.

8. The method of claim 7 in which the R-succinic compound forms from an anhydride added to the alumina trihydrate bearing slurry or the wash fluid.

9. The method of claim 1, wherein the wash fluid comprises water.

10. The method of claim 1, wherein the wash fluid consists essentially of water.

11. The method of claim 1, wherein the composition is added to the slurry alongside the wash fluid, before the wash fluid, after the wash fluid, or combinations thereof.

12. The method of claim 1, wherein the composition is added to the wash fluid.

13. The method of claim 5, wherein the removing liquor and water from the alumina trihydrate bearing slurry comprises filtration.

14. The method of claim 5, wherein the wash fluid is added to the slurry before the removing, during the removing, after the removing, or combinations thereof.

15. The method of claim 5, wherein the removing liquor and water from the alumina trihydrate bearing slurry comprises gravity separation, pressure separation, vacuum separation, or combinations thereof.

* * * * *

UNITED STATES PATENT AND TRADEMARK OFFICE
CERTIFICATE OF CORRECTION

PATENT NO. : 9,630,855 B2
APPLICATION NO. : 14/190507
DATED : April 25, 2017
INVENTOR(S) : Carl Nicholas Urbani Page 1 of 1

It is certified that error appears in the above-identified patent and that said Letters Patent is hereby corrected as shown below:

In the Specification

Column 6, Line 43 "5,454,329," should be - 5,451,329, -

Signed and Sealed this
Thirteenth Day of November, 2018

Andrei Iancu
*Director of the United States Patent and Trademark Office*